US012571624B2

(12) United States Patent
Loeken et al.

(10) Patent No.: US 12,571,624 B2
(45) Date of Patent: Mar. 10, 2026

(54) METHOD FOR INITIALIZING AN ANGLE-OF-ROTATION MEASUREMENT SYSTEM, AND ANGLE-OF-ROTATION MEASUREMENT SYSTEM

(71) Applicant: FRABA B.V., SG Heerlen (NL)

(72) Inventors: Michael Loeken, Juelich (DE); Florian Hallermann, Aachen (DE)

(73) Assignee: FRABA B.V., SG Heerlen (NL)

( * ) Notice: Subject to any disclaimer, the term of this patent is extended or adjusted under 35 U.S.C. 154(b) by 293 days.

(21) Appl. No.: 18/276,044

(22) PCT Filed: Feb. 8, 2021

(86) PCT No.: PCT/EP2021/052961
§ 371 (c)(1),
(2) Date: Aug. 7, 2023

(87) PCT Pub. No.: WO2022/167099
PCT Pub. Date: Aug. 11, 2022

(65) Prior Publication Data
US 2024/0093981 A1    Mar. 21, 2024

(51) Int. Cl.
*G01B 7/30* (2006.01)
*G01D 5/20* (2006.01)
(52) U.S. Cl.
CPC ................. *G01B 7/30* (2013.01); *G01D 5/20* (2013.01)
(58) Field of Classification Search
CPC .................................... G01B 7/30; G01D 5/20
See application file for complete search history.

(56) References Cited

U.S. PATENT DOCUMENTS

| | | | |
|---|---|---|---|
| 5,353,010 A | 10/1994 | Sanetra | |
| 11,088,598 B2 * | 8/2021 | Forthaus | .............. H02K 11/215 |
| 2013/0200883 A1 * | 8/2013 | Mehnert | ................ G01D 5/145 |
| | | | 324/207.2 |
| 2013/0317761 A1 * | 11/2013 | Mehnert | ................... G01F 1/58 |
| | | | 702/45 |

FOREIGN PATENT DOCUMENTS

| | | |
|---|---|---|
| DE | 10 2014 116 209 A1 | 5/2016 |
| GB | 2 071 336 A | 9/1981 |
| GB | 2 126 351 A | 3/1984 |
| JP | H6-174472 A | 6/1994 |
| JP | 2003-75519 A | 3/2003 |
| JP | 2010-249764 A | 11/2010 |
| JP | 2021-12174 A | 2/2021 |

OTHER PUBLICATIONS

D. Z. Bai et al.: "Degaussing PMR Writer Poles: A Micromagnetic Modeling Study", IEEE Transactions on Magnetics, vol. 47, No. 10, pp. 3407-3410 (2011).

* cited by examiner

*Primary Examiner* — Reena Aurora
(74) *Attorney, Agent, or Firm* — Norman B. Thot

(57) ABSTRACT
A method for initializing a Wiegand-sensor-based rotary angle measuring system. The method includes mounting the Wiegand-sensor-based rotary angle measuring system at a place of use, and feeding an initialization alternating current into a sensor coil which, after the mounting, radially surrounds a Wiegand wire. The initialization alternating current is provided with a current direction which alternates with time and with a current amplitude which decreases with time.

14 Claims, 4 Drawing Sheets

METHOD FOR INITIALIZING AN ANGLE-OF-ROTATION MEASUREMENT SYSTEM, AND ANGLE-OF-ROTATION MEASUREMENT SYSTEM

CROSS REFERENCE TO PRIOR APPLICATIONS

This application is a U.S. National Phase application under 35 U.S.C. § 371 of International Application No. PCT/EP2021/052961, filed on Feb. 8, 2021. The International Application was published in German on Aug. 11, 2022 as WO 2022/167099 A1 under PCT Article 21(2).

FIELD

The present invention is directed to a method for initializing a Wiegand-sensor-based rotary angle measuring system, and to a Wiegand-sensor-based rotary angle measuring system for detecting a rotary motion of a shaft, comprising a permanent-magnetic excitation unit which can be mounted so as to rotate with a shaft that is to be detected, and a stationary Wiegand sensor comprising a Wiegand wire and a sensor coil which radially surrounds the Wiegand wire.

BACKGROUND

Wiegand-sensor-based rotary angle measuring systems are known in the prior art and are in particular used for controlling and monitoring electric motors, in particular servo motors, in machines, plants or vehicles. Rotary angle measuring systems are often also referred to as an angle measuring device, a rotary angle sensor or a rotary encoder.

The permanent-magnetic excitation unit is mounted so as to rotate with the shaft and is configured so that an alternating excitation magnetic field is generated at the location of the Wiegand sensor when the excitation unit is rotated. The Wiegand wire of the Wiegand sensor is magnetically bistable, wherein a magnetization direction of the Wiegand wire inverts abruptly under the impact of an excitation magnetic field which is sufficiently strong and directed opposite with respect to the magnetization direction of the Wiegand wire. This abrupt inversion of the magnetization of the Wiegand wire generates a short voltage pulse in the sensor coil which radially surrounds the Wiegand wire. The alternating excitation magnetic field generated during the rotation of the excitation unit thereby continuously generates voltage pulses in the sensor coil of the Wiegand sensor, wherein the frequency of the voltage pulses is directly proportional to a rotational speed of the excitation unit and thus directly proportional to a rotational speed of the shaft.

If the Wiegand sensor is exposed to a strong magnetic field, for example. during transport or mounting, the Wiegand wire can become so strongly magnetized that the excitation magnetic field generated by the excitation unit during operation of the rotary angle measuring system is not sufficient to completely invert the magnetization of the Wiegand wire. Only relatively weak voltage pulses are generated in the sensor coil as a result which cannot be reliably detected by an evaluation unit of the rotary angle measuring system. Due to the relatively weak voltage pulses, malfunctions can furthermore occur in energetically autarkic Wiegand-sensor-based rotary angle measuring systems, in which the electric energy of the voltage pulses is used to supply energy to the entire rotary angle measuring system, due to an insufficient energy supply.

SUMMARY

An aspect of the present invention is to provide a reliable Wiegand-sensor-based rotary angle measuring system.

In an embodiment, the present invention provides a method for initializing a Wiegand-sensor-based rotary angle measuring system. The method includes mounting the Wiegand-sensor-based rotary angle measuring system at a place of use, and feeding an initialization alternating current into a sensor coil which, after the mounting, radially surrounds a Wiegand wire. The initialization alternating current is provided with a current direction which alternates with time and with a current amplitude which decreases with time.

BRIEF DESCRIPTION OF THE DRAWINGS

The present invention is described in greater detail below on the basis of embodiments and of the drawings in which.

DETAILED DESCRIPTION

Figure 1:
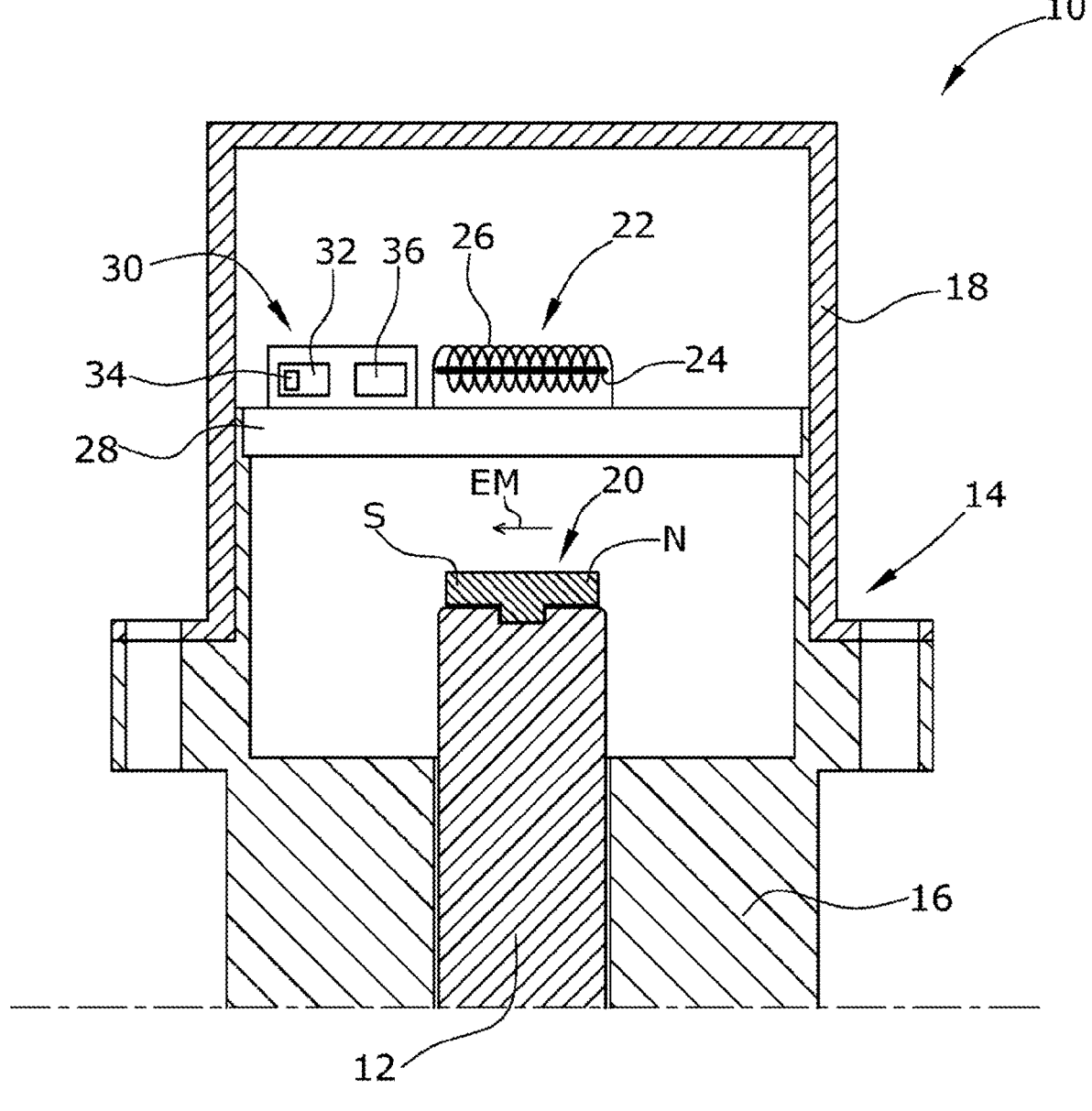
FIG. 1 shows a schematic illustration of a Wiegand-sensor-based rotary angle measuring system according to the present invention.

In the method for initializing a Wiegand-sensor-based rotary angle measuring system according to the present invention, the rotary angle measuring system is first mounted at the place of use. A permanent-magnetic excitation unit is in particular mounted on a shaft to be detected so as to rotate with the shaft, and a Wiegand sensor with a Wiegand wire and with a sensor coil which radially surrounds the Wiegand wire is arranged so that an alternating excitation magnetic field is generated by the excitation unit at the location of the Wiegand sensor during a rotation of the excitation unit. The excitation unit is typically directly attached to an axial end of the shaft during the mounting process. The Wiegand sensor is typically arranged in a housing which, during the mounting, is placed on the axial end of the shaft that holds the excitation unit.

After mounting the rotary angle measuring system at the place of use, the present invention provides that an initialization alternating current is fed into the sensor coil, which radially surrounds the Wiegand wire, by an initialization unit of the rotary angle measuring system, wherein the initialization alternating current is provided with a current direction which alternates with time and with a current amplitude which decreases with time. Inside the coil, i.e., at the location of the Wiegand wire, an initialization magnetic field is hereby generated which is directed parallel to an axial direction of the Wiegand wire and the direction of which alternates with time and the amplitude/strength of which decreases with time.

Since the Wiegand wire is ferromagnetic, the so-called "elementary magnets" within the Wiegand wire tend to align themselves along an externally applied magnetic field. Due to the alternating initialization magnetic field, these elementary magnets are consequently continuously "flipped over", wherein the proportion of elementary magnets that flip over at each direction reversal of the initialization magnetic field decreases with the decreasing strength of the initialization magnetic field. This generates a relatively disordered arrangement of the elementary magnets within the Wiegand wire so that, in a macroscopic view, the Wiegand wire has essentially no magnetic polarization, i.e., it is not magnetized.

The method for initializing a Wiegand-sensor-based rotary angle measuring system according to the present invention thus provides that a magnetization of the Wiegand wire, which could potentially be caused by the transport or the mounting of the rotary angle measuring system, is ideally completely eliminated or at least significantly reduced. This provides for a reliable reversal of the magnetization of the Wiegand wire during operation via the excitation magnetic field that is generated by the permanent-magnetic excitation unit, and thus provides for a reliable detection of the shaft rotation. The initialization method according to the present invention consequently provides for a reliable Wiegand-sensor-based rotary angle measuring system.

The current direction of the initialization alternating current which is fed into the sensor coil and thus the direction of the initialization magnetic field generated thereby can, for example, change at least five times, for example, at least 10 times, for example, at least 20 times. This provides for a reliable reduction of the magnetization of the Wiegand wire.

In an embodiment of the present invention, a starting current amplitude of the initialization alternating current at the beginning of the feeding of the initialization alternating current into the sensor coil can, for example, be at least twice, for example, at least three times, as large as an ending current amplitude of the initialization alternating current at the end of the feeding of the initialization alternating current into the sensor coil in order to reliably reduce the magnetization of the Wiegand wire.

Prior to the feeding of the initialization alternating current, the permanent-magnetic excitation unit of the rotary angle measuring system is advantageously arranged so that an excitation magnetic field, which is generated by the excitation unit at the location of the Wiegand wire, is transverse to the axial direction of the Wiegand wire, i.e., the magnetic field lines of the excitation magnetic field run essentially transverse to the axial direction of the Wiegand wire. The excitation unit can, for example, be arranged so that an angle between the axial direction of the Wiegand wire and the excitation magnetic field is 700 to 110°, for example, 80° to 100°. The excitation magnetic field consequently has no or only a relatively small excitation magnetic field component parallel to the axial direction of the Wiegand wire so that the excitation magnetic field has no significant influence on the reversal of the magnetization of the Wiegand wire. This enables a reliable reversal of the magnetization of the Wiegand wire and thus a reliable reduction of the magnetization of the Wiegand wire.

In an alternative advantageous embodiment of the present invention, the excitation unit can, for example, be rotated at a constant rotational frequency while the initialization alternating current is fed, and the initialization alternating current is pulsed so that initialization alternating current pulses are fed into the sensor coil at times when an excitation magnetic field generated by the excitation unit at the location of the Wiegand wire is transverse to an axial direction of the Wiegand wire. The initialization alternating current pulses can, for example, in each case be fed into the sensor coil at a time at which an angle between the axial direction of the Wiegand wire and the excitation magnetic field is 700 to 110°, for example, 800 to 100°. The excitation magnetic field can be detected using the Wiegand sensor or an additional magnetic field sensor. As described above, energizing the sensor coil at a time at which the excitation magnetic field is transverse to the axial direction of the Wiegand wire allows for a reliable reversal of the magnetization of the Wiegand wire and thus a reliable reduction of the magnetization of the Wiegand wire. No exact positioning of the excitation unit is required to achieve this effect due to the uniform rotation of the excitation unit and the controlled pulsing of the initialization alternating current.

In another alternative advantageous embodiment of the present invention, the permanent-magnetic excitation unit can, for example, be moved during the impressing of the initialization alternating current into the sensor coil so that a parallel component of the excitation magnetic field generated at the location of the Wiegand wire by the excitation unit, which parallel component is parallel to the axial direction of the Wiegand wire, and a parallel component of the initialization magnetic field generated at the location of the Wiegand wire by feeding the initialization alternating current into the sensor coil, which parallel component is parallel to the axial direction of the Wiegand wire, are always directed in the same direction, i.e., at all times point in the same direction. The terms "always" and "at all times" are thereby to be interpreted so that the parallel component of the excitation magnetic field and the parallel component of the initialization magnetic field are directed in the same direction during a predominant temporal portion of the feeding process so that the excitation magnetic field "supports" the initialization magnetic field in the reversal of the magnetization of the Wiegand wire. This provides a reliable reduction of the magnetization of the Wiegand wire with relatively low current amplitudes and thus with a relatively low electrical energy without requiring an exact positioning of the excitation unit.

The excitation unit can, for example, be rotated at a constant rotation frequency during the feeding of the initialization alternating current, wherein the rotation frequency of the excitation unit is directly proportional to an alternation frequency of the initialization alternating current. The proportionality factor herein is equal to the reciprocal of the number of magnetic poles of the excitation unit so that the alternation frequency of the excitation magnetic field generated at the location of the Wiegand sensor is equal to the alternation frequency of the initialization magnetic field generated by feeding the initialization alternating current into the sensor coil. This represents a relatively easy way to move the excitation unit so that the parallel component of the excitation magnetic field and the parallel component of the initialization magnetic field are always directed in the same direction during the entire feeding of the initialization alternating current, since the excitation unit must be rotationally aligned only once before the start of the feeding of the initialization alternating current.

In an alternative embodiment of the present invention, the excitation unit can, for example, be alternately rotated clockwise and counterclockwise during the feeding of the initialization alternating current so that an alternation frequency of the direction of rotation of the excitation unit is directly proportional to an alternation frequency of the initialization alternating current. This allows the excitation unit to be moved so that the parallel component of the excitation magnetic field and the parallel component of the initialization magnetic field are always directed in the same direction during the entire feeding of the initialization alternating current without requiring significant absolute rotation of the excitation unit and thus of the shaft to which the excitation unit is attached.

The excitation unit can, for example, be rotated so that an angle of rotation, by which the excitation unit is rotated clockwise or counterclockwise, respectively, decreases with time. The absolute value of the parallel component of the excitation magnetic field at the times of the extreme values of the initialization alternating current decreases with time as a result, which allows the magnetization of the Wiegand wire to be reduced particularly efficiently.

The Wiegand-sensor-based rotary angle measuring system for detecting a rotary motion of a shaft according to the present invention comprises a permanent-magnetic excitation unit which can be mounted so as to rotate with a shaft that is to be detected. The excitation unit may be formed by a single permanent-magnetic body or may have multiple permanent-magnets attached to a magnet carrier. The excitation unit is typically rotationally symmetrical and provided with magnetic poles that are uniformly distributed along a circumference of the excitation unit. The excitation unit is typically directly attached to an axial end of the shaft.

The Wiegand-sensor-based rotary angle measuring system for detecting a rotary motion of a shaft according to the present invention comprises a stationary Wiegand sensor with a Wiegand wire and with a sensor coil which radially surrounds the Wiegand wire. The general design and operation of the Wiegand sensor are known from the prior art. The Wiegand sensor is arranged so that an alternating excitation magnetic field is generated by the excitation unit at the location of the Wiegand sensor when the excitation unit is rotated. The Wiegand sensor is typically arranged in a housing that is placed on the axial end of the shaft which holds the excitation unit.

According to the present invention, an initialization unit is additionally provided which is configured to feed an initialization alternating current into the sensor coil, wherein the initialization alternating current is provided with a current direction that alternates with time and with a current amplitude that decreases with time. The initialization unit is thus configured to generate, at the location of the Wiegand wire, an initialization magnetic field which is directed parallel to an axial direction of the Wiegand wire, the direction of which alternates with time, and the amplitude/strength of which decreases with time. The initialization unit may be constituted by a special electric circuit and/or by an appropriately programmed integrated circuit or microcontroller. The initialization unit may comprise its own current source which is electrically connected to the sensor coil, or may be configured to control a separate current source which is electrically connected to the sensor coil.

As described above, the initialization unit allows the elimination or at least the significant reduction of a magnetization of the Wiegand wire that could potentially be caused by the transport or mounting of the rotary angle measuring system, and consequently provides a reliable Wiegand-sensor-based rotary angle measuring system.

The Wiegand-sensor-based rotary angle measuring system according to the present invention can, for example, comprise an evaluation unit with a current source, wherein the evaluation unit is configured to feed a detection current into the sensor coil via the current source for detecting a magnetization direction of the Wiegand wire, wherein the initialization unit is configured to feed the initialization alternating current into the sensor coil via the current source of the evaluation unit. The evaluation unit may be constituted by a special electric circuit and/or by an appropriately programmed integrated circuit or microcontroller. The evaluation unit and the initialization unit can, for example, be constituted by a single integrated circuit. This provides a compact, simply constructed Wiegand-sensor-based rotary angle measuring system.

An embodiment of a Wiegand-sensor-based rotary angle measuring system according to the present invention as well as different embodiments of a method for initializing the Wiegand-sensor-based rotary angle measuring system according to the present invention are described below with reference to the drawings.

FIG. 1 shows a Wiegand-sensor-based rotary angle measuring system 10 mounted on an axial end of a shaft 12. The Wiegand-sensor-based rotary angle measuring system 10 comprises a housing 14 with a housing bottom part 16 that is mounted on the shaft 12 and radially surrounds the shaft, and with a housing cover 18 that is attached to the housing bottom part 16.

The Wiegand-sensor-based rotary angle measuring system 10 further comprises a permanent-magnetic excitation unit 20 that is attached to an end face of the shaft 12 in a rotationally fixed manner and that is positioned concentrically with respect to the shaft 12. In the present embodiment, the permanent-magnetic excitation unit 20 is a diametrically magnetized disc magnet with a single magnetic north pole N and a single magnetic south pole S. The permanent-magnetic excitation unit 20 generates an excitation magnetic field EM.

The Wiegand-sensor-based rotary angle measuring system 10 further comprises a Wiegand sensor 22 with a Wiegand wire 24 and with a sensor coil 26 that radially surrounds the Wiegand wire 24. The Wiegand sensor 22 is arranged on a printed circuit board 28 that is fastened in the housing axially spaced from the permanent-magnetic excitation unit 20. The Wiegand sensor 22 is arranged so that the Wiegand wire 24 extends perpendicular to the axial direction of the shaft 12 and is positioned concentrically with respect to the excitation unit.

The Wiegand-sensor-based rotary angle measuring system 10 further comprises an integrated circuit 30 that constitutes an evaluation unit 32 with a current source 34 and an initialization unit 36. The integrated circuit 30 is arranged on the printed circuit board 28 and is electrically connected to the Wiegand sensor 22.

The evaluation unit 32 is configured to evaluate voltage pulses that are generated in the sensor coil 26. The evaluation unit 32 is further configured to feed a detection current into the sensor coil 26 via the current source 34 in order to detect a magnetization direction of the Wiegand wire 24.

The initialization unit 36 is configured to feed an initialization alternating current IS with a current direction that alternates with time and with a current amplitude ISA that decreases with time into the sensor coil 26 via the current source 34 of the evaluation unit 32 in order to generate an initialization magnetic field IM with a magnetization direction that alternates with time and with a magnetic field amplitude IMA that decreases with time.

After being mounted on the shaft 12, an initialization of the Wiegand sensor-based rotary angle measuring system 10 is carried out via the initialization unit 36.

Figure 2:
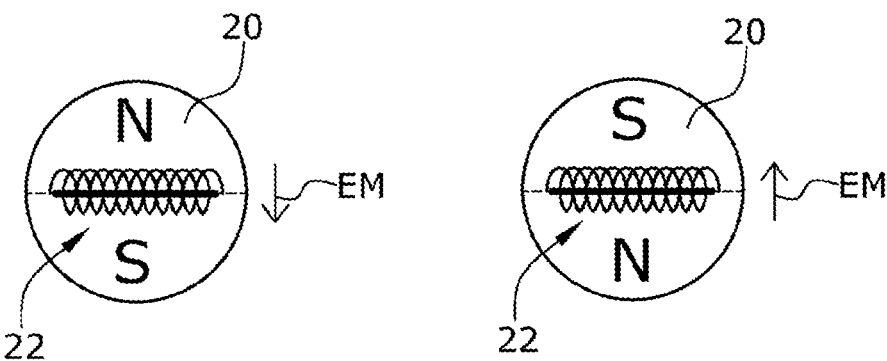
FIG. 2 shows possible initialization positions of an excitation unit with respect to a Wiegand sensor for a first and a second embodiment of the initialization method for initializing the rotary angle measuring system according to the present invention of FIG. 1.

In a first embodiment, for initializing the Wiegand-sensor-based rotary angle measuring system 10, the permanent-magnetic excitation unit 20 is aligned with respect to the Wiegand sensor 22 according to one of the two arrangements schematically illustrated in FIG. 2. The permanent-magnetic excitation unit 20 is thus arranged so that the excitation magnetic field EM is perpendicular to the axial direction of the Wiegand wire 24, i.e., the magnetic field lines of the excitation magnetic field EM run substantially perpendicular to the axial direction of the Wiegand wire 24.

Subsequently, the initialization alternating current IS is fed into the sensor coil 26 by the initialization unit 36, wherein the fed initialization alternating current IS is provided with the temporal course schematically shown in FIG. 3. By feeding the initialization alternating current IS into the sensor coil 26, an initialization magnetic field IM is generated which is parallel to the axial direction of the Wiegand wire 24, i.e., the magnetic field lines of which run substantially parallel to the axial direction of the Wiegand wire 24. The direction of the initialization magnetic field IM is defined via the current direction of the initialization alternating current IS.

Figure 3:
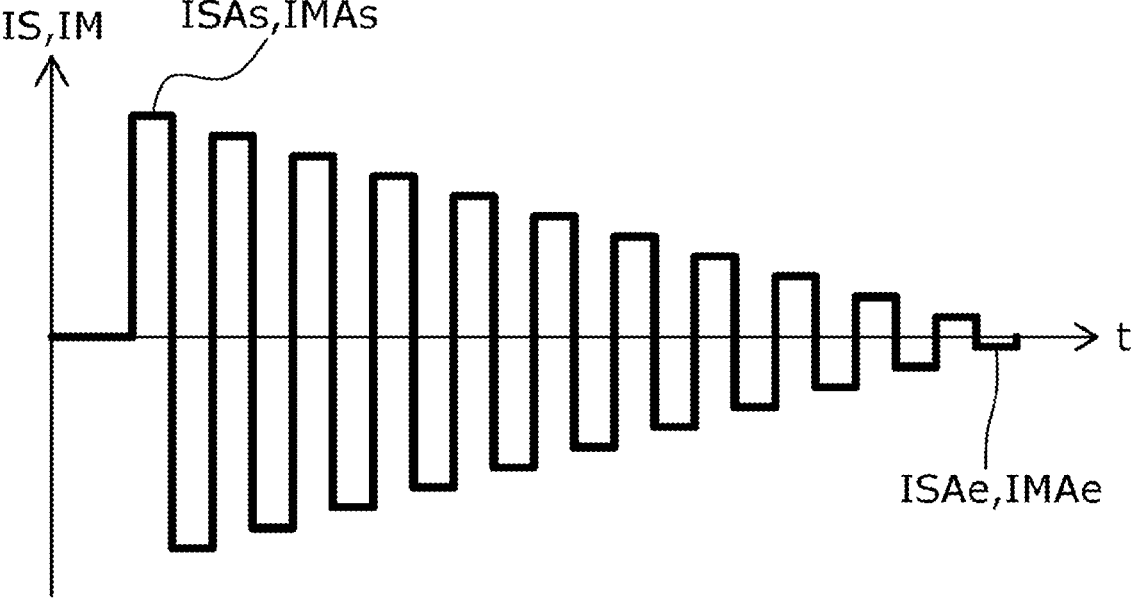
FIG. 3 shows a schematic course of an initialization alternating current which is fed into a sensor coil of the Wiegand sensor of the rotary angle measuring system of FIG. 1 during an initialization method according to the present invention, and of an initialization magnetic field which is generated by the feeding.

FIG. 3 specifically shows the schematic course of the initialization alternating current IS over time t, as well as the schematic course of the initialization magnetic field IM generated at the location of the Wiegand wire 24 by feeding the initialization alternating current IS into the sensor coil 26. Since the magnetic field amplitude IMA of the initialization magnetic field IM is substantially directly proportional to the current amplitude ISA of the initialization alternating current IS, the course of the initialization alternating current IS and the initialization magnetic field IM are represented by a single curve in FIG. 3 for simplicity. The current direction of the initialization alternating current IS and the magnetization direction of the initialization magnetic field IM are respectively given by the sign of the initialization alternating current IS and of the initialization magnetic field IM. For simplicity, the initialization alternating current IS has a rectangular shape. However, the initialization alternating current IS may in principle have any alternating waveform with decreasing amplitude. The initialization alternating current IS may in particular also have a sawtooth-shaped or a sinusoidal course.

The initialization alternating current IS is provided with a relatively large starting current amplitude ISAs at the beginning of the feeding so that the initialization magnetic field IM is provided with a relatively large starting magnetic field amplitude IMAs. The current amplitude ISA of the initialization alternating current IS is continuously decreased with time t so that the initialization alternating current IS is provided with a relatively low ending current amplitude ISAe at the end of the feeding. The magnetic field amplitude IMA of the initialization magnetic field IM consequently decreases with time t to a relatively low ending magnetic field amplitude IMAe.

The starting current amplitude ISAs can, for example, be at least twice as large as the ending current amplitude ISAe, for example, at least three times as large as ending current amplitude ISAe. The current direction of the initialization alternating current IS can, for example, change at least 10 times, for example, at least 20 times, during the feeding.

In a second embodiment, the permanent-magnetic excitation unit 20 is rotated at a constant rotation frequency during the feeding of the initialization alternating current IS, and the excitation magnetic field EM is detected via the Wiegand sensor 22 and/or via an additional magnetic field sensor (which is not shown in the drawings). An initialization alternating current pulse ISP is fed into the sensor coil 26 by the initialization unit 36 each time when an angle between the axial direction of the Wiegand wire and the excitation magnetic field is 80° to 100°, i.e., when the excitation magnetic field EM is substantially transverse to the axial direction of the Wiegand wire. The initialization alternating current pulses ISP are herein provided with a current direction that alternates with time and with a current amplitude ISA that decreases with time.

Figure 4:
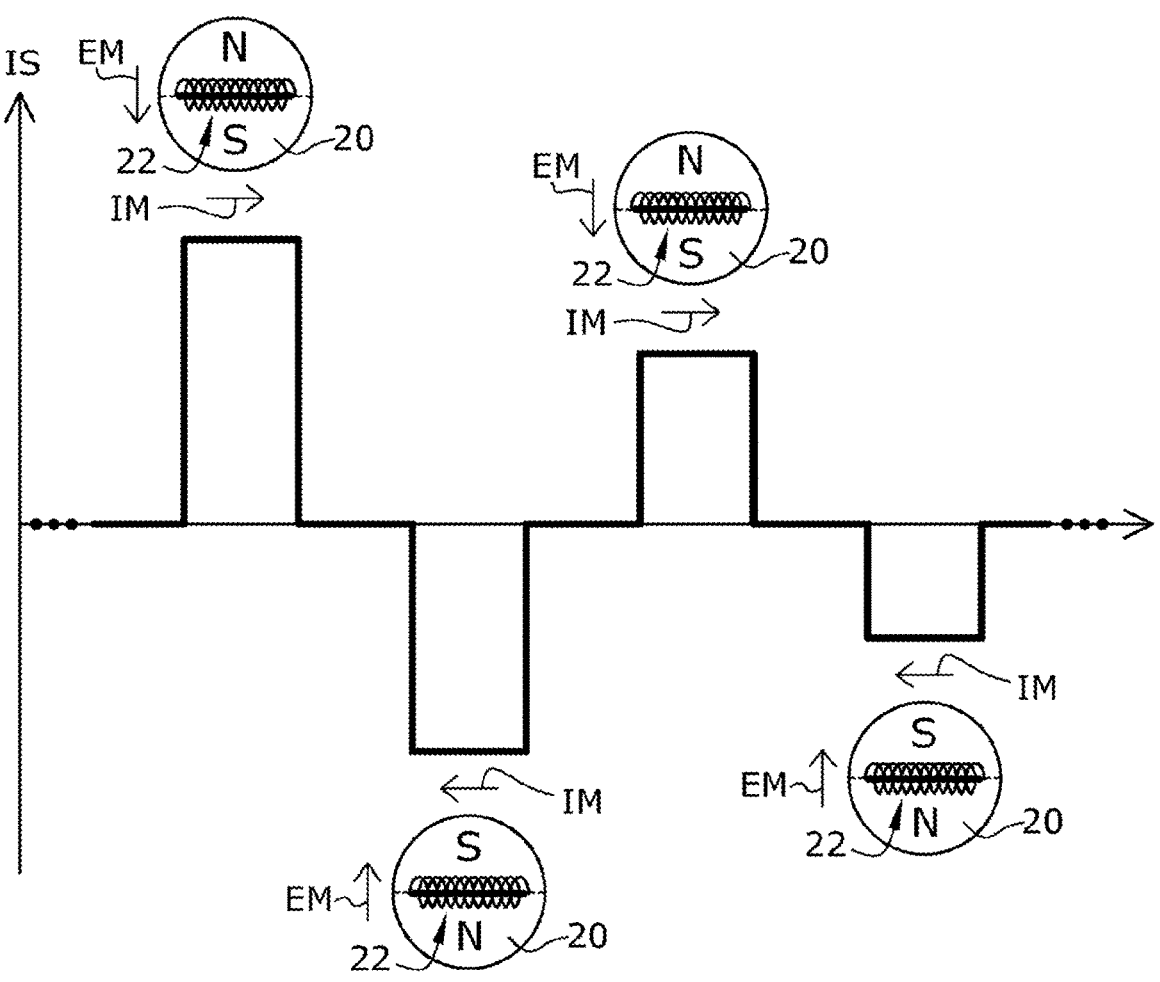
FIG. 4 shows a part of a schematic course of an initialization alternating current which is fed into the sensor coil during the second embodiment of the initialization method according to the present invention, as well as positions of the excitation unit with respect to the Wiegand sensor at times of extreme values of the initialization alternating current.

FIG. 4 shows a part of the course of the initialization alternating current IS and the orientation of the permanent-magnetic excitation unit 20 at the times of the initialization alternating current pulses ISP, respectively, resulting from the rotation of the permanent-magnetic excitation unit 20.

Figure 5:
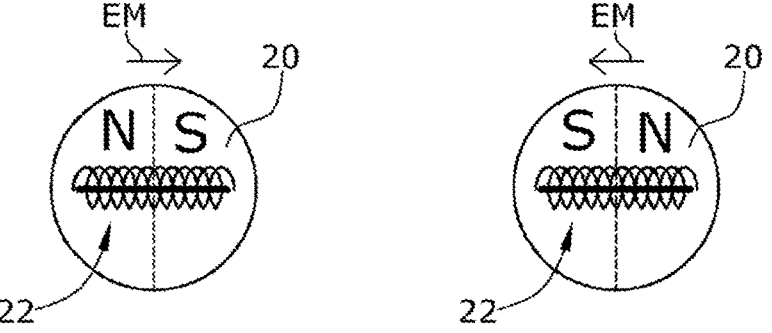
FIG. 5 shows possible start positions of the excitation unit with respect to the Wiegand sensor for a third, a fourth, and a fifth embodiment of the initialization method according to the present invention.

In a third embodiment, the permanent-magnetic excitation unit 20 is aligned with respect to the Wiegand sensor 22 at the beginning of the initialization of the Wiegand-sensor-based rotary angle measurement system 10 according to one of the two arrangements schematically illustrated in FIG. 5. The permanent-magnetic excitation unit 20 is thus arranged so that the excitation magnetic field EM is parallel to the axial direction of the Wiegand wire 24, i.e., the magnetic field lines of the excitation magnetic field EM run substantially parallel to the axial direction of the Wiegand wire 24.

A starting current direction of the initialization alternating current IS at the beginning of the feeding process is always set so that a parallel component of the excitation magnetic field EM, which parallel component is parallel to the axial direction of the Wiegand wire 24, and a parallel component of the initialization magnetic field IM, which parallel component is parallel to the axial direction of the Wiegand wire 24, are directed in the same direction.

During the feeding of the initialization alternating current IS, the permanent-magnetic excitation unit 20 is rotated at a constant rotational frequency, wherein the rotational frequency of the excitation unit is half as large as an alternation frequency of the initialization alternating current IS, i.e., half as large as the frequency at which the current direction of the initialization alternating current changes. This results in the parallel component of the excitation magnetic field EM and the parallel component of the initialization magnetic field IM always being directed in the same direction.

Figure 6:
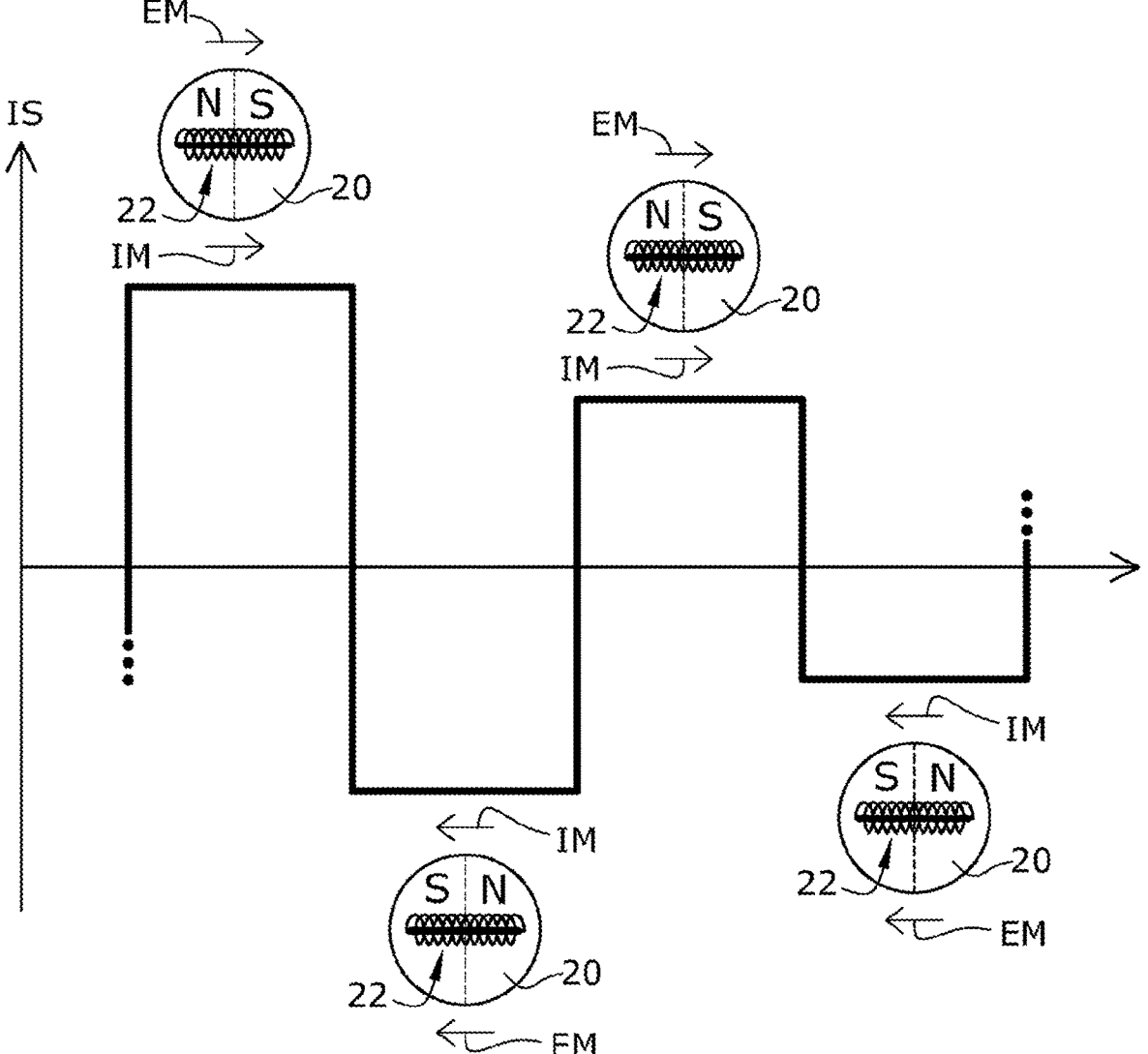
FIG. 6 shows a part of a schematic course of an initialization alternating current which is fed into the sensor coil during the third and fourth embodiments of the initialization method according to the present invention, as well as positions of the excitation unit with respect to the Wiegand sensor at times of extreme values of the initialization alternating current.

FIG. 6 shows a part of the course of the initialization alternating current IS and the orientation of the permanent-magnetic excitation unit 20 at the times of the extreme values of the initialization alternating current IS, respectively, resulting from the rotation of the permanent-magnetic excitation unit 20.

In a fourth embodiment, starting from one of the two arrangements schematically illustrated in FIG. 5, the permanent-magnetic excitation unit 20 is not rotated at a constant rotation frequency with respect to the Wiegand sensor 22, but is constantly rotated alternately by 180° clockwise and by 180° counterclockwise. A rotation direction alternation frequency, i.e., the frequency at which the direction of rotation of the excitation unit is inverted, is herein exactly as large as the alternation frequency of the initialization alternating current IS so that the parallel component of the excitation magnetic field EM and the parallel component of the initialization magnetic field IM are always directed in the same direction as well.

The temporal course of the initialization alternating current IS and the alignment of the permanent-magnetic excitation unit 20 at the times of the extreme values of the initialization alternating current IS resulting from the "back and forth rotation" of the permanent-magnetic excitation unit 20 for the fourth embodiment are substantially identical to the course for the third embodiment schematically illustrated in FIG. 6.

In a fifth embodiment, starting from one of the two arrangements schematically illustrated in FIG. 5, the permanent-magnetic excitation unit 20 is constantly rotated alternately clockwise and counterclockwise with respect to the Wiegand sensor 22, wherein, as in the fourth embodiment, the alternation frequency of the rotation direction is exactly the same as the alternation frequency of the initialization alternating current IS.

In contrast to the fourth embodiment, however, the excitation unit in the fifth embodiment is not always rotated back and forth by a constant rotation angle of 180°, but is rotated back and forth by a rotation angle that decreases with time so that the magnitude of the parallel component of the excitation magnetic field EM at the times of the extreme values of the initialization alternating current IS decreases with time.

The present invention is not limited to embodiments described herein; reference should be had to the appended claims.

LIST OF REFERENCE CHARACTERS

10 Wiegand-sensor-based rotary angle measuring system
12 shaft
14 housing
16 housing bottom part
18 housing cover
20 permanent-magnetic excitation unit
22 Wiegand sensor
24 Wiegand wire
26 sensor coil
28 printed circuit board
30 integrated circuit
32 evaluation unit
34 current source
36 initialization unit
EM excitation magnetic field
IM initialization magnetic field
IMA magnetic field amplitude of the initialization magnetic field
IMAs starting magnetic field amplitude of the initialization magnetic field
IMAe ending magnetic field amplitude of the initialization magnetic field
IS Initialization alternating current
ISA current amplitude of the initialization alternating current
ISAs starting current amplitude of the initialization alternating current
ISAe ending current amplitude of the initialization alternating current
ISP initialization alternating current pulses
N magnetic north pole
S magnetic south pole
t time

10

What is claimed is:

1. A method for initializing a Wiegand-sensor-based rotary angle measuring system, the method comprising:
mounting the Wiegand-sensor-based rotary angle measuring system at a shaft the rotary motion of which is to be detected; and
feeding an initialization alternating current into a sensor coil which, after the mounting, radially surrounds a Wiegand wire,
wherein,
the initialization alternating current is provided with a current direction which alternates with time and with a current amplitude which decreases from a starting current amplitude to an ending current amplitude with time.

2. The method as recited in claim 1, wherein the current direction of the initialization alternating current changes at least five times.

3. The method as recited in claim 1, wherein the current direction of the initialization alternating current changes at least 20 times.

4. The method as recited in claim 1, wherein, the starting current amplitude of the initializing alternating current at a beginning of the feeding is at least twice as large as the ending current amplitude of the initializing alternating current (IS) at an end of the feeding.

5. The method as recited in claim 1, wherein, the starting current amplitude of the initializing alternating current at a beginning of the feeding is at least three times as large as the ending current amplitude of the initializing alternating current at an end of the feeding.

6. The method as recited in claim 1, wherein, prior to the feeding of the initialization alternating current, the method further comprises:
arranging a permanent magnetic excitation unit so that an excitation magnetic field, which is generated by the permanent magnetic excitation unit at a location of the Wiegand wire, is transverse to an axial direction of the Wiegand wire.

7. The method as recited in claim 6, further comprising:
generating an excitation magnetic field via the permanent magnetic excitation unit at the location of the Wiegand wire;
rotating the permanent magnetic excitation unit at a constant rotation frequency during the feeding of the initialization alternating current; and
pulsing the initialization alternating current so that initialization alternating current pulses are fed into the sensor coil when the excitation magnetic field which is generated by the permanent magnetic excitation unit at the location of the Wiegand wire is transverse to the axial direction of the Wiegand wire.

8. The method as recited in claim 1, further comprising:
moving a permanent magnetic excitation unit during the feeding of the initialization alternating current so that a parallel component of an excitation magnetic field generated by the permanent magnetic excitation unit at a location of the Wiegand wire, the parallel component being parallel to an axial direction of the Wiegand wire, and a parallel component of an initialization magnetic field generated at the location of the Wiegand wire via the feeding of the initialization alternating current into the sensor coil, the parallel component being parallel to the axial direction of the Wiegand wire, are always directed in a same direction.

9. The method as recited in claim 8, further comprising:
rotating the permanent magnetic excitation unit at a
    constant rotation frequency during the feeding of the
    initialization alternating current,
wherein,
the constant rotation frequency is directly proportional to
    an alternation frequency of the initialization alternating
    current.
10. The method as recited in claim 8, further comprising:
alternately rotating the permanent magnetic excitation
    unit clockwise and counterclockwise during the feed-
    ing of the initialization alternating current so that an
    alternation frequency of a direction of rotation of the
    permanent magnetic excitation unit is directly propor-
    tional to an alternation frequency of the initialization
    alternating current.
11. The method as recited in claim 10, further comprising:
decreasing the rotation of the permanent magnetic exci-
    tation unit with time so that a rotation angle about
    which the permanent magnetic excitation unit is rotated
    clockwise    and    counterclockwise,    respectively,
    decreases with time.
12. A Wiegand-sensor-based rotary angle measuring sys-
tem for detecting a rotary motion of a shaft, the Wiegand-
sensor-based rotary angle measuring system comprising:
    a permanent magnetic excitation unit which is configured
        to be mounted so as to rotate with a shaft the rotary
        motion of which is to be detected;

a stationary Wiegand sensor comprising a Wiegand wire
        and a sensor coil which is arranged to radially surround
        the Wiegand wire; and
    an initialization unit which is configured to feed an
        initialization alternating current into the sensor coil,
    wherein,
    the initialization alternating current is provided with a
        current direction that alternates with time and with a
        current amplitude which decreases from a starting
        current amplitude to an ending current amplitude with
        time.
13. The Wiegand-sensor-based rotary angle measuring
system as recited in claim 12, further comprising:
    an evaluation unit which comprises a current source, the
        evaluation unit being configured to feed a detection
        current into the sensor coil via the current source for
        detecting a magnetization direction of the Wiegand
        wire,
    wherein,
    the initialization unit is further configured to feed the
        initialization alternating current into the sensor coil via
        the current source of the evaluation unit.
14. The Wiegand-sensor-based rotary angle measuring
system as recited in claim 13, further comprising:
    a single integrated circuit,
    wherein,
    the evaluation unit and the initialization unit are each
        constituted by the single integrated circuit.

* * * * *